Oct. 4, 1932.   C. A. DE GIERS   1,881,266
REMOTE CONTROL APPARATUS
Filed Oct. 1, 1930   6 Sheets-Sheet 1

Oct. 4, 1932.  C. A. DE GIERS  1,881,266
REMOTE CONTROL APPARATUS
Filed Oct. 1, 1930  6 Sheets-Sheet 3

Inventor
C. A. de Giers
By his Attorneys
Cooper, Kerr & Dunham

Patented Oct. 4, 1932

1,881,266

UNITED STATES PATENT OFFICE

CLARENCE A. DE GIERS, OF FOREST HILLS, NEW YORK, ASSIGNOR TO LIQUIDOMETER CORPORATION, OF LONG ISLAND CITY, NEW YORK, A CORPORATION OF DELAWARE

REMOTE CONTROL APPARATUS

Application filed October 1, 1930. Serial No. 485,808.

This invention pertains to remote control devices of the hydraulic type and covers improvements thereon to better adapt them to various uses.

The principal objects of the invention are: (a) to improve the temperature compensating feature of the apparatus by use of choke coils; (b) to improve the temperature compensating feature of the apparatus by use of automatically operable valves; (c) to provide automatic temperature compensation by submerging the apparatus in liquid; (d) to adapt the system for use as a thermometer giving an indication of temperature on fan-shaped and on circular dials; (e) to adapt the system for use as a pressure gauge.

Further and other objects and advantages will be apparent from the specification and claims, and from the accompanying drawings which illustrate what is now considered the preferred embodiment of the invention.

Figure 1:
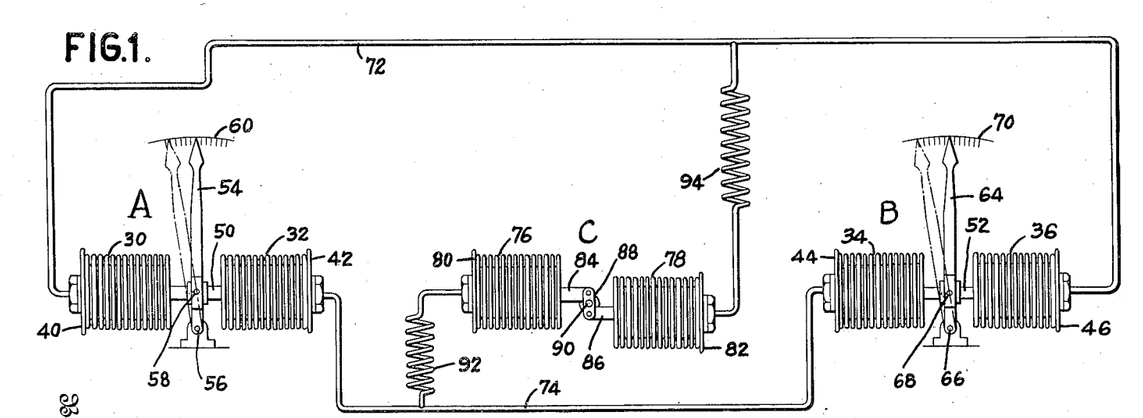
Fig. 1 is a diagrammatic representation of a complete remote control or transmission system in which temperature compensation is effected through choke coils.

Referring to Fig. 1 of the drawings, the invention is shown in somewhat diagrammatic form but with sufficient detail to enable the invention to be fully understood.

The unit at one end of the transmitting system is designed "A" and the one at the other end "B". Movement may be transmitted from A to B or from B to A.

Each unit comprises a pair of similar fluid tight containers of variable capacity. These containers are preferably in the form of sylphons 30 and 32 in unit A, and 34 and 36 in unit B. Each pair of sylphons is supported in axial alignment, the outer ends of the sylphons being rigidly supported in frame plates 40, 42, 44 and 46, respectively, while the free ends of each pair are interconnected by bars 50, 52, respectively.

A pointer 54 in unit A, fulcrumed on the frame at 56 and pivoted on bar 50 at 58, serves to indicate on chart 60 any horizontal movement of bar 50. Arcuate movement of pivot 58 is permitted by the flexibility of the sylphons.

In similar manner a pointer 64 in unit B, fulcrumed on the frame at 66 and pivoted on bar 52 at 68, serves to indicate on chart 70 any horizontal movement of bar 52.

The fixed ends of sylphons 30 and 36 are interconnected by tube 72, the sylphons and tube being filled with liquid, such as cold-proof oil. In like manner sylphons 32 and 34 are connected by tube 74, all filled with oil.

It is a familiar property of sylphons that they expand or contract readily axially without appreciably changing their diameters. With that in mind, operation of the apparatus thus far described will be readily understood. If, for instance, pointer 54 of unit A be moved to the right, sylphon 30 will be forcibly expanded axially and sylphon 32 forcibly contracted axially by bar 50 through the instrumentality of pivot 58. Expansion of sylphon 30 will draw oil through tube 72 from sylphon 36 of unit B, causing sylphon 36 to contract axially in proportion to the axial lengthening of sylphon 30. Axial contraction of sylphon 32 will, on the other hand, force oil through pipe 74 into sylphon 34 and cause it to lengthen axially in proportion to the axial shortening of sylphon 32. Briefly, then, the free ends of all the sylphons of both units A and B move to the right, and pointer 64 moves to the right and in synchronism with pointer 54.

In like manner movement of pointer 54 to the left will be indicated by pointer 64, and any movement of pointer 64 to the right or left will be indicated by pointer 54 at the other end of the system.

The above described apparatus would be sufficient for the purpose intended, provided the temperature remained constant. However, when changes of temperature occur, the volume of the oil changes, as well as the cubic contents of the sylphons, tubes, etc., and incorrect indications would be given were it not for the temperature compensating device now to be described.

Between units A and B is a third unit C comprising a pair of similar sylphons 76 and 78 arranged not on the same axial line, as are the sylphons in units A and B, but on parallel lines. Their outer ends are fixed to frame plates 80 and 82 respectively, while their adjacent ends, instead of being rigidly interconnected as in units A and B, are connected by studs 84 and 86 to the free ends of a link 88 fulcrumed at 90. The fixed end of sylphon 76 is connected through a choke pipe or tube 92 to tube 74, while the fixed end of sylphon 78 is in like manner connected through choke coil 94 to tube 72. The sylphons and tubes of unit C are of course filled with the same kind of fluid as the other parts of the system.

Figure 2:
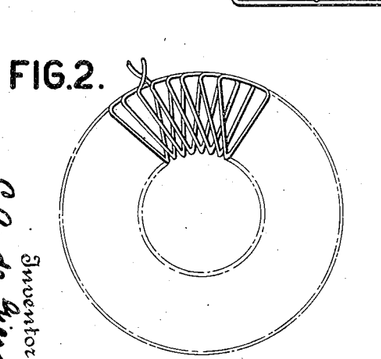
Figs. 2 to 5, inclusive, show various forms of choke coils.
Figure 3:
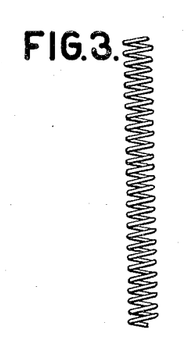
Figure 4:
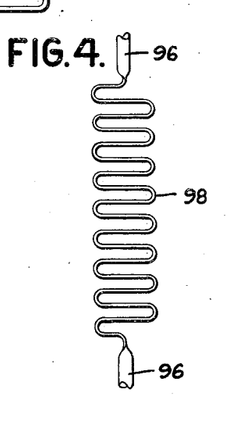
Figure 5:
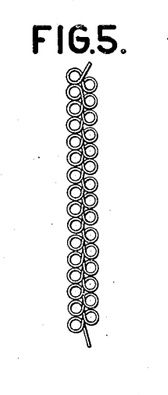

Changes of temperature occur very gradually, and whenever they occur, causing changes of volume of the fluid and its containers, fluid seeps from tubes 72 and 74 through choke coils 94 and 92 into or out of sylphons 76 and 78, causing them to both expand or both contract equal amounts axially, because both lines contain the same amount of liquid, and causing link 88 to swing idly about its fulcrum 90, thus permitting a change in volume of the fluid and its container without affecting the functioning of the system or the relative positions of pointers 54, 64. Coils 92 and 94 are described as choke coils because they are so long and of such comparatively small bore as to permit fluid to seep through them only very slowly. The coils may be of a great variety of designs, and may even be pieces of straight tubing. However, the tube is usually coiled in the form of a helix, as in Fig. 3, or it may be a round tube 96 (Fig. 4) flattened as at 98 for a portion of its length. If it is necessary to provide a long tube in little space the tubing may be coiled in some such manner as is disclosed in Figs. 2 and 5.

In normal operation of the apparatus the changes in pressure of the liquid in the system are very rapid as compared to changes due to variations of temperature, so rapid, in fact, that the choke coils do not permit passage of oil in the time available. Therefore, under normal conditions of operation, unit C remains undisturbed, responding only to changes of temperature, which occur slowly. Unit C, therefore, acts as a compensator to insure proper operation of the apparatus when changes of temperature occur, being protected by the choke coils against surge of pressure which sometimes in service might cause temporary folding of the compensating linkage.

Figures 6, 7:
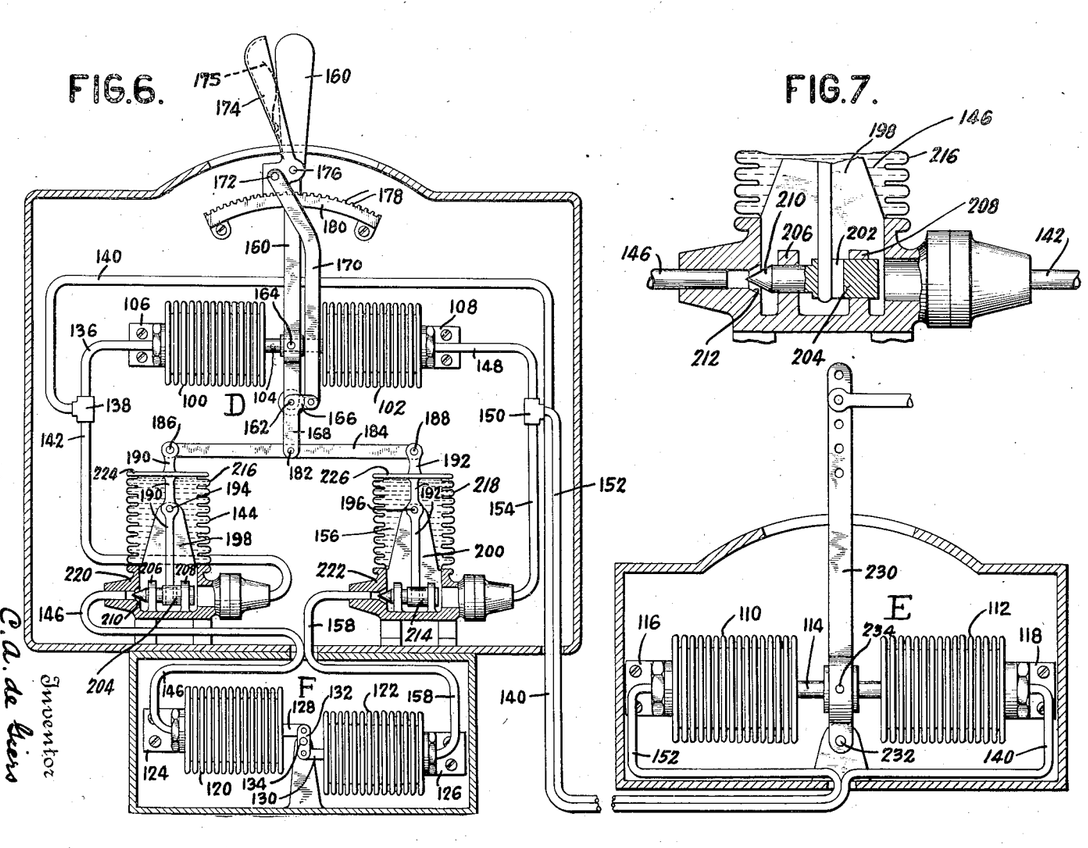
Fig. 6 is a diagrammatic representation of a complete remote control system in which the temperature control device is put out of commission temporarily by automatic valves whenever the system is being operated.
Fig. 7 is an enlarged detail view of a valve used in Fig. 6.

A modified form of temperature compensation is disclosed in Fig. 6, in which there is a transmitting unit D, a receiving unit E, and a temperature compensating unit F.

Unit D comprises a pair of similar sylphons 100, 102, arranged axially with their adjacent ends interconnected by a rod 104 and their non-adjacent ends fast to the frame by plates 106, 108. In like manner unit E comprises similar sylphons 110, 112 interconnected by bar 114 and fast to the frame by plates 116, 118, respectively.

Temperature compensating unit F comprises two similar sylphons 120, 122 on parallel axes, their outer ends being fixed to frame plates 124, 126 and their adjacent ends being connected by studs 128, 130 to the free ends of link 132 fulcrumed at 134.

The fixed end of sylphon 100 is connected by tube 136, T 138 and tube 140, to the fixed end of sylphon 112. It is also connected by tube 142, chamber 144 and tube 146 to the fixed end of sylphon 120. In like manner the fixed end of sylphon 102 is connected by tube 148, T 150 and tube 152 to the fixed end of sylphon 110, and by pipe 154, chamber 156 and pipe 158 to the fixed end of sylphon 122. All the sylphons are full of fluid preferably oil.

A manually operable lever 160, fulcrumed to the frame at 162, is pivotally connected at 164 to bar 104, so that whenever lever 160 is rocked to right or left one sylphon 100, 102 will be axially compressed and the other axially extended.

Also fulcrumed on 162 is a bell crank having a horizontal arm 166 and a downwardly extending arm 168. Extending upwardly from the free end of arm 166 is a link 170, connected at its upper end by pin 172 to latch lever 174, fulcrumed at 176 on lever 160. The lower end of lever 174 is provided with suitable teeth to engage corresponding teeth 178 on fixed quadrant 180. The lower end of bell crank arm 168 is pivotally connected at 182 to the middle of horizontal link 184, the ends thereof being pivotally connected at 186, 188 to the upper ends of vertical levers 190, 192, fulcrumed at 194, 196, on brackets 198, 200.

The lower end of lever 190 passes loosely through a vertical hole 202 (Fig. 7) in a valve 204 arranged to slide horizontally in brakets 206, 208, and provided with a conical end 210 adapted to engage a conical seat 212 for the purpose of opening or closing the end of tube 146. Similarly the lower end of lever 192, through valve 214, may open and close the end of tube 158. Chambers 144 and 146 formed by sylphons 216 and 218 sealed at their lower ends to valve chambers 220, 222 and at their upper ends to flanges 224, 226 integral with levers 190, 192.

From the above description it will be clear that in order to move hand lever 160 it is necessary to first move latch lever 174 to free its lower end from teeth 178 of quadrant 180. Simultaneously with that operation, link 170 causes bell-crank arm 168 to move to the right and, through the instrumentality of link 184, causes levers 190 and 192 to swing clockwise about their fulcrums 194 and 196, thereby moving valves 204 and 214 to the left to close the ends of pipes 146 and 158. Whenever latch lever 174 is released, the parts resume their normal positions as in Fig. 6, spring 175 serving to restore the parts to normal position and to hold them there.

From the above it will be appreciated that during manipulation of lever 160 the temperature compensating unit F is, by the closing of pipes 146 and 158, shut off entirely from the balance of the system, which functions as follows. Movement of lever 160 to the right will compress sylphon 102, forcing oil therefrom through pipes 148, 152 into sylphon 110 expanding it axially to the right. At the same time sylphon 100 will be expanded axially, drawing oil from sylphon 112 through pipes 136, 140, to contact sylphon 112 axially the same amount as sylphon 110 is expanded. A lever 230, fulcrumed on the frame at 232 and pivotally connected at 234 to rod 114, will therefore be moved to the right in harmony with the movement of lever 160. In like manner a movement of lever 160 to the left will cause the free ends of all sylphons of units D and E and lever 230 to move to the left.

So long as the temperature remains constant the above described apparatus will always move lever 230 in harmony with lever 160, but if a change of temperature occurs, the volume of liquid in the system and of the containers of the liquid will change, so that results obtained at any one temperature will not agree with those obtained at some other temperature; i. e., a change of temperature causes inaccuracy in the operation of the instrument. To prevent that inaccuracy the temperature compensating unit F is provided. The apparatus is operated only intermittently with periods of rest betwen operations. During those rest periods sylphons 120 and 122 are in communication with the rest of the system through pipes 146 and 151, therefore oil from the system may flow into or out of sylphons 120, 122 at will, the sylphons, as they expand or contract, simply rocking link 132 about its fulcrum. Then when manual operation of the apparatus takes place the sylphons 120, 122 are automatically disconnected from the rest of the system as described.

Figure 8:
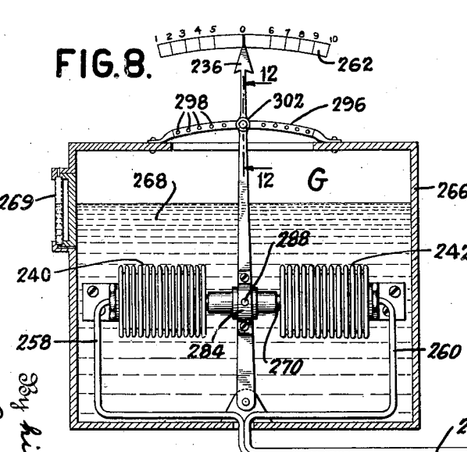
Fig. 8 is a diagrammatic representation of a remote control system in which the transmitting unit is submerged in liquid.
Figures 9, 10:
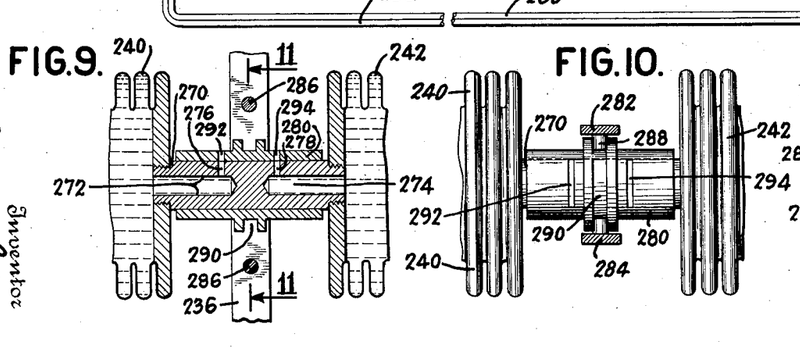
Figs. 9 and 10 show in cross-section an enlarged detail of the transmitting unit.
Figure 11:
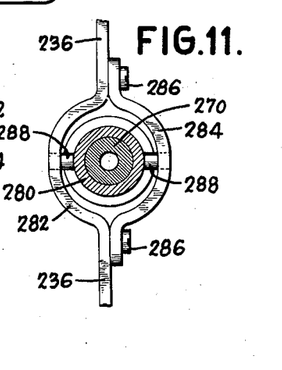
Fig. 11 is a view on the line 11—11 of Fig. 9.

In Figs. 8 to 11, inclusive, is shown another modification of the remote control system which has a temperature compensating device especially adapted for conditions under which operation of the apparatus is only momentary, as for instance in an annunciator system on shipboard, a call system in a factory, etc. The complete system, as shown in Fig. 8, comprises transmitting and receiving units G and H corresponding to units A and b, respectively, in Fig. 1, and operable generally in the same manner, pointer 236 serving as the transmitting lever and pointer 238 serving as the remote indicator in place of pointers 54 and 64 of Fig. 1. Unit G includes sylphons 240, 242, and unit H has sylphons 244, 246, the free ends of the latter being interconnected by rod 248, which, through pivot 250, operates pointer 238 fulcrumed at 252. An added feature in this modification is the use of springs 254, 256 attached to the frame and to the pointer for returning pointer 238 (and pointer 236) to zero whenever pointer 236 is released by the operator. The outer ends of all the sylphons are fixed to the frame in the usual manner and the fixed ends of sylphons 240, 242 are connected by tubes 258, 260 to the fixed ends of sylphons 246, 244, respectively.

Under constant temperature conditions the above described system gives correct results, i. e., pointer 238 will move in harmony and in synchronism with pointer 236, and both will give the same indications on their respective charts 262, 264. Furthermore both pointers will return to zero when pointer 236 is released. However, if a change of temperature occurs the volume of oil in the system and the volume of the containers of the oil will change, with the result that the indications of pointer 238 may not correspond with those of 236. The means for preventing such inaccuracies will now be described.

Figure 12:
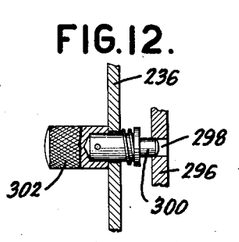
Fig. 12 is a detail on the line 12—12 of Fig. 8.

The sylphons of unit G are surrounded by a tank 266 containing liquid 268 of the same kind as is used within the system, and of sufficient depth to keep sylphons 240, 242 submerged. A gauge glass 269 indicates the level of liquid 268. The adjacent ends of sylphons 240, 242 are connected by a rod 270, counterbored from both ends as at 272, 274 and radially drilled or slotted as at 276, 278 to provide passages from counterbores 272, 274 to the surface of rod 270. Surrounding rod 270 is a sleeve 280 shiftable lengthwise on rod 270 by pointer 236 through the instrumentality of a shifter yoke (Fig. 11) formed by a bent portion 282 of pointer 236 and a companion piece 284 fastened to the pointer by screws 286, the yoke surrounding sleeve 280 and engaging it by shifter studs 288 adapted to enter a circumferential groove 290 in the sleeve. The sleeve is provided with openings 292, 294 so positioned as to register with passages 276, 278, respectively, when pointer 236 is at zero. While at zero position, therefore, the interiors of sylphons 240, 242 are in free communication through passages 272, 276, 292, and 274, 278, 294, respectively, with the surrounding oil 268 so that if a temperature change occurs, oil may flow into or out of the system to maintain normal conditions therein. When pointer 236 is moved to right or left, sleeve 280 is moved relatively to rod 270 until openings 292, 294 are out of registry with passages 276, 278, whereupon the end of the sleeve abuts the head of sylphon 242 or 240, and the system then transmits movement in the usual manner to pointer 238. On account of the lost motion of pointer 236 before the end of sleeve contacts with one of the transmitting sylphons, pointer 238 does not begin to move until pointer 236 has moved some distance from its zero position, consequently the spaces at right and left of zero on chart 262 are wider than the corresponding spaces on chart 264. However, when pointer 236 points to any numbered graduation on chart 262, pointer 238 will point to the corresponding graduation on chart 264. For convenience of the operator in maintaining indicator 236 on any particular graduation, a fixed quadrant 296 is provided, having holes 298 corresponding to the indications on the chart, and pointer 236 is fitted with a spring-retained plunger 300 having a knob 302 (Fig. 12).

Figure 13:
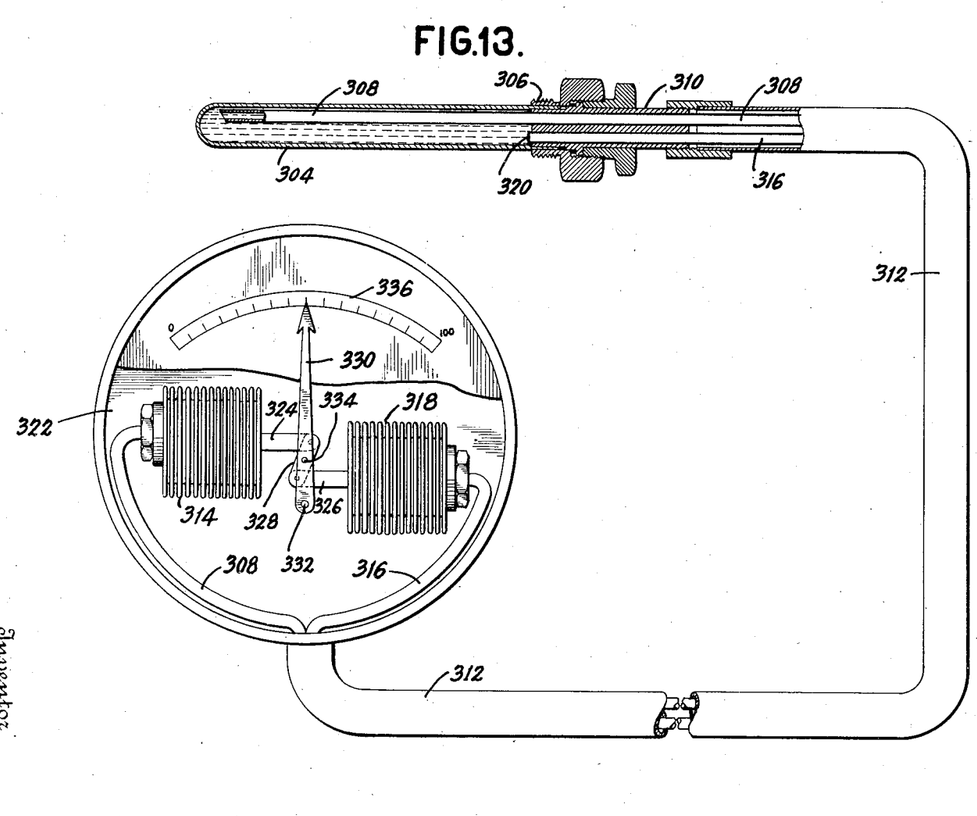
Fig. 13 shows a thermometer with remote indicator and temperature compensator, the indicator being a pointer moving over a fan-shaped chart.

Fig. 13 shows a modification of the system adapting it for indicating temperature. A bulb 304 is provided with a screw thread 306 adapting it to be screwed into a boiler or other vessel in which it is desired to take temperature observations. A tube 308 extends from the inner end of the bulb through a fitting 310 and conduit 312 to the fixed end of sylphon 314. A tube 316 runs from the fixed end of sylphon 318 through conduit 312 and fitting 310 to terminate at the end thereof with a sealed end 320. The sylphons, tubes, and bulb are filled with liquid, and the sylphons are mounted on the gauge frame 322 on parallel offset axes, with their outer ends fixed but with their inner ends pivotally connected by rods 324 and 326 to opposite ends of link 328. A pointer 330 fulcrumed at 332 is pivotally connected by pin 334 to the middle of link 328. The upper end of the pointer passes over a temperature indicating chart 336.

In operation, when a change of temperature occures in bulb 304 the liquid therein will expand or contract and some of it will be forced into or out of tube 308, thereby causing sylphon 314 to expand or contract axially, thereby swinging pointer 330 about its fulcrum 332 through the instrumentality of link 328 the lower pivot of which is stationary.

The above described apparatus will give correct results while the gauge, conduit, and transmission tubes remain at a fixed temperature, but will give incorrect results if said temperature varies. In order to insure correct indications under changeable temperatures, tube 316 and sylphon 318 are provided. Tubes 308 and 316 being similar and of the same length outside of bulb 304, and sylphons 314 and 318 being similar, any change of atmospheric temperature will affect tube 308 and its sylphon 314 exactly as tube 316 and its sylphon 318 are affected; consequently sylphons 314 and 318, under such conditions, will expand or contract similar amounts axially, thus rotating link 328 idly about its central pivot 334, without moving pointer 330. A change of temperature within bulb 304, however, will move pointer 330, and the combination of devices will give correct indications of temperature within the bulb, regardless of changes of temperature without the bulb.

The temperature indicating apparatus has been shown and described with a fan-shaped chart and with no mechanical adjustments for zero or capacity. If a chart of 360 degrees is desired, with adjustments for zero and capacity, an indicator such as shown in Fig. 14 may be used in place of the gauge illustrated in Fig. 13.

Figure 14:
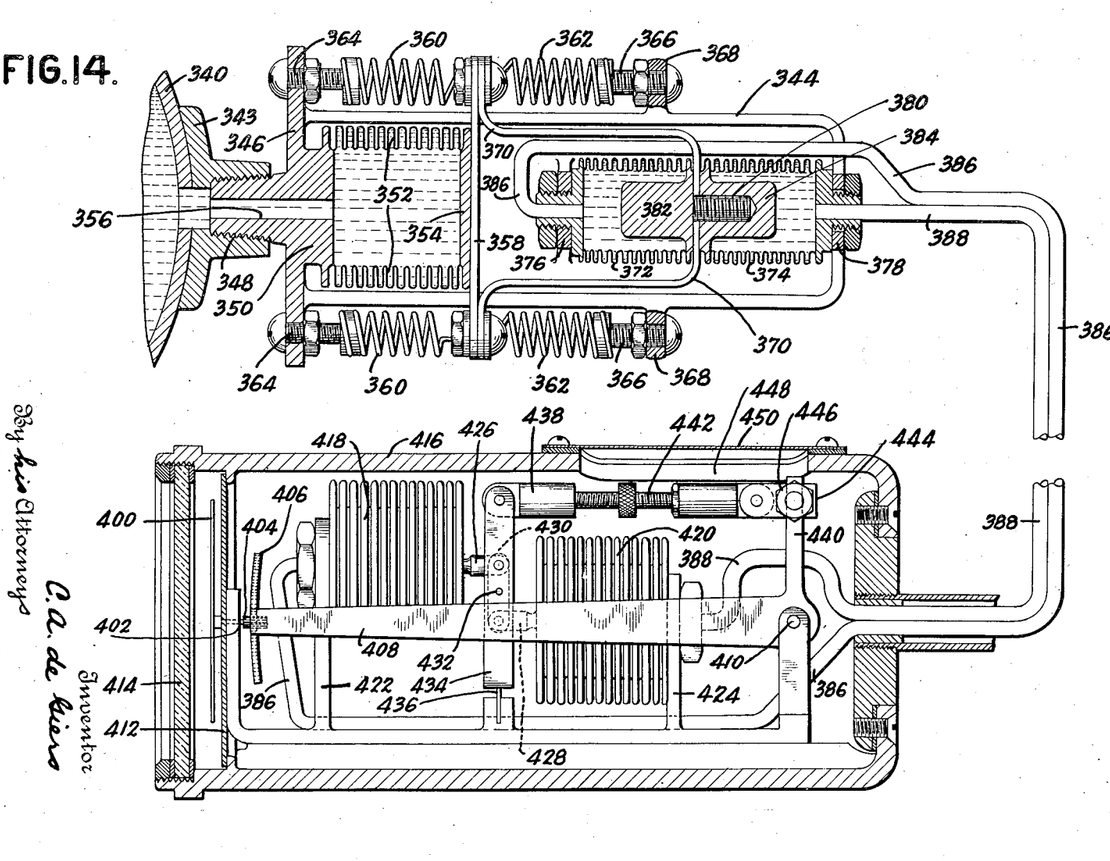
Fig. 14 is a view in cross-section of a remote indicating pressure gauge.
Figure 15:
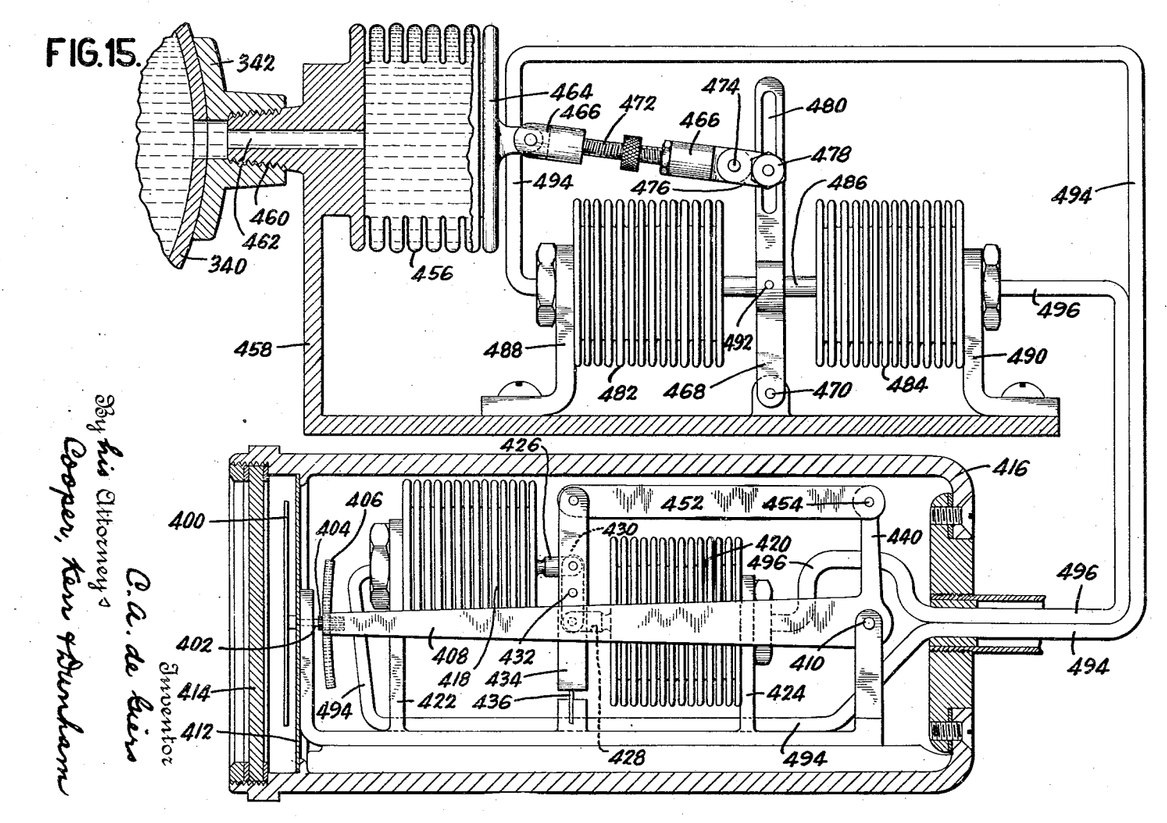
Fig. 15 is a view in cross-section of a remote indicating pressure gauge differing in detail from the apparatus shown in Fig. 14.

In Figs. 14 and 15 the system is shown as operating a pressure gauge. For the purpose of illustration a pressure tank 340 is shown having a flange 343 for convenience in attaching the actuating unit of the system. Considering first the modification shown in Fig. 14, a frame 344 having a base 346 is attached by nipple 348 to flange 342. Base 346 is provided with a boss 350 to which is attached a sylphon 352 having a head 354. There is a passage through base 346, through which the sylphon is filled with the same fluid as the tank. Any change of pressure in the tank will therefore be felt by the sylphon, causing it to expand or contract axially.

Fast to head 354 and extending beyond it is a bar 358, to the outer ends of which are attached a pair of springs 360 tending to draw the bar toward base 346, and another pair of springs 362 tending to draw the bar in the opposite direction. The fixed ends of springs 360 are attached to base 346 by adjusting screws 364 while the fixed ends of springs 362 are attached by adjusting screws 366 to lugs 368 on frame 344. The above described arrangement of springs is provided to supplement the elasticity of sylphon 352. The springs are adjusted by their adjusting screws so that even when there is no pressure in the tank the sylphon will still be under substantial tension, thereby insuring a firm and definite zero reading which might not be the case were the sylphon allowed to become entirely deflated under zero pressure. Springs 360 and 362 being similar and opposed, the position of the sylphon head will be unaffected by changes of atmospheric temperature.

Attached to bar 358 is a U shaped yoke 370, to the cross bar of which are fast the free ends of a pair of axially aligned sylphons 372 and 374, the fixed ends of which are fast to bosses 376 and 378 respectively, integral with frame 344. The adjacent heads of the sylphons are secured to yoke 370 by a screw 380 on head 382 of sylphon 372 passing through the yoke into head 384 of sylphon 374.

It will be apparent from the above that yoke 370 will move back and forth with head 354 of sylphon 352, and that when such movements occur one of the sylphons 372, 374 will be expanded and the other contracted axially. Sylphons 372 and 374 are connected by tubes 386 and 388, respectively, to the indicating unit, which will now be described.

The indicating unit comprises a pointer 400, mounted for rotation on a spindle 402 carrying a pinion 404 in mesh with a rack 406 carried on the free end of arm 408 fulcrumed at 410. Pointer 400 rotates in front of a chart 412 and behind glass window 414 through which the indications of the pointer on the chart may be read. The indicating mechanism is all contained in a tubular housing 416 within which are mounted a pair of similar sylphons 418, 420. These sylphons are on parallel offset axes, their outer ends being fast to housing brackets 422, 424, respectively, and their adjacent ends being pivotally connected by studs 426, 428 to upper and lower ends of link 430. The center of the link is connected by pivot pin 432 to arm 434 attached to the housing by plate fulcrum 436. The free end of arm 434 is connected by link 438 to upwardly projecting arm 440, integral with arm 408.

Link 438 is adjustable in length by means of right and left screw 442 for the purpose of zero adjustment of pointer 400. The link is connected to arm 440 by block 444 settable on arm 440 by screw 446 for the purpose of adjusting the amplitude of rotation of arms 440, 408, and consequently of pointer 400. Hand hole 448 with cover 450 is provided to give access to the adjustments.

Tubes 386 and 388 are connected to the fixed ends of sylphons 418, 420 respectively, and both pairs of sylphons, with the tubes, are full of liquid.

In operation, when a change of pressure occurs, expansion or contraction of sylphon 352 will cause yoke 370 to axially expand one of the sylphons 372, 374 and contract the other, thereby, through movement of liquid through tubes 386, 388 causing one of the sylphons 418, 420 to contract and the other to expand axially to move link 430 bodily to left or right and causing arms 434, 440 and 408 to swing about their fulcrums, thus causing pointer 400 to move to a new position relatively to chart 412.

If a change of atmospheric temperature occurs, thereby changing the volumes of sylphons 372, 374, 418, 420, of the tubes connecting them, and of the liquid contained in the sylphons and tubes, the effect is simply to axially expand or axially contract sylphons 418, 420 similar amounts, thereby rotating link 430 about its fulcrum 432 without moving arm 434. Therefore the position of pointer 400 is not changed by change of temperature.

The modification shown in Fig. 15 is very similar to that described above. The indicating unit is exactly the same except that adjustable link 438 is replaced by a non-adjustable link 452 connected to arm 440 by a pivot pin 454 which is fixed in position on arm 440. Since there are no adjustments on link 452, there is no need for hand hole 448, which is therefore omitted. The actuating unit includes a power sylphon 456 in place of the corresponding sylphon 352 of Fig. 14. At its fixed end it is sealed to frame 458 which is attached to flange 342 by nipple 460 and connected to the interior of the tank by passage 462.

The movable head 464 of sylphon 456 is connected by link 466 to the free end of arm 468 fulcrumed at 470. Link 466 is adjustable in length by the right and left screw 472 to provide a zero adjustment for pointer 400. The pivotal connection of the link to arm 468 is at 474, through the instrumentality of a clamp block 476, settable at any desired point on arm 468 by bolt 478 passing through slot 480, thus providing an adjustment for amplitude of rotation of the pointer.

A pair of axially aligned sylphons 482, 484 (corresponding to 372, 374 of Fig. 14) are arranged with their adjacent ends joined by rod 486 and their outer ends fixed to brackets 488, 490 mounted on frame 458. Rod 486 is pivotally connected to arm 468 at 492. The fixed end of sylphons 482, 484 are connected to the fixed ends of sylphons 418, 420 by tubes 494, 496, respectively.

In operation a change of pressure in the tank will cause sylphon 456 to expand or contract axially, and, through link 466, arm 468 and rod 486 will cause one of the sylphons 482, 484 to expand and the other to contract, thus, as in Fig. 14, actuating sylphons 418, 420 and their attached transmission system to move pointer 400.

It is to be understood that the invention is not limited to the specific embodiment herein illustrated and described but may be used in other ways without departure from its spirit as defined by the claims which follow.

I claim—

1. A movement transmitting apparatus comprising, in combination, a pair of movable devices remote from each other, hydraulic means for interconnecting said devices whereby either device will move in synchronism with the other of said devices when movement is imparted to the latter, temperature compensating means associated with said hydraulic interconnecting means whereby the correct functioning of the apparatus is independent of temperature changes, and flow retarding means for rendering said temperature compensating means responsive to comparatively slow temperature changes but unresponsive to comparatively rapid movements of said movable devices.

2. A movement transmitting apparatus comprising, in combination, a pair of movable devices remote from each other, hydraulic pipe lines interconnecting said devices whereby the remote device will move in synchronism with the near device when movement is imparted to the latter, an hydraulic temperature compensating device connected to said pipe lines and operable therefrom, and flow retarding means for rendering said temperature compensating means responsive to comparatively slow temperature changes but unresponsive to comparatively rapid movements of said movable devices.

3. A movement transmitting apparatus comprising, in combination, a pair of movable devices remote from each other, hydraulic pipe lines interconnecting said devices whereby the remote device will move in synchronism with the near device when movement is imparted to the latter, and an hydraulic temperature compensating device connected to said pipe lines and operable therefrom, said connection being through choke coils whereby the compensating device will be responsive to comparatively slow temperature changes but unresponsive to comparatively rapid movements of said movable devices.

4. A movement transmitting apparatus comprising, in combination, a pair of movable devices remote from each other, hydraulic pipe lines interconnecting said devices whereby the remote device will move in synchronism with the near device when movement is imparted to the latter, and an hydraulic temperature compensating device connected to said pipe lines through restricted passages whereby liquid may pass from said lines to said device or vice versa whenever a comparatively slow change of temperature occurs but may not pass whenever a comparatively rapid manual manipulation of the apparatus occurs.

5. The invention set forth in claim 4, in which said passages comprise choke coils.

6. A movement transmitting apparatus comprising, in combination, a pair of movable devices remote from each other, hydraulic pipe lines interconnecting said devices whereby the remote device will move in synchronism with the near device when movement is imparted to the latter, a pair of opposed parallel sylphons having their adjacent movable ends connected to a pivoted link and each of their outer fixed ends connected by a choke coil to one of said pipe lines whereby when a change of temperature occurs liquid may flow through said coils into or out of both said sylphons whereby said link is idly rotated and the correct functioning of said apparatus is undisturbed, substantially as described.

7. A movement transmitting apparatus comprising, in combination, a pair of movable devices remote from each other, hydraulic pipe lines interconnecting said devices whereby the remote device will move in synchronism with the near device when movement is imparted to the latter, an hydraulic temperature compensating device connected to said pipe lines, and means for rendering said compensating means inoperative while said apparatus is being manually operated.

8. A movement transmitting apparatus comprising, in combination, a pair of movable devices remote from each other, means for interconnecting said devices whereby either device will move in synchronism with the other of said devices when movement is imparted to the latter, temperature compensating means whereby the functioning of the apparatus is independent of changes of temperature, and means for rendering said compensating means inoperative while the apparatus is being manually operated.

9. A movement transmitting apparatus comprising, in combination, a pair of movable devices remote from each other, hydraulic pipe lines interconnecting said devices whereby the remote device will move in synchonism with the near device when movement is imparted to the later, an hydraulic temperature compensating device connected to said pipe lines, valves in said connections, and means for automatically closing said valves while manual operation of the apparatus is occurring.

10. A movement transmitting apparatus comprising, in combination, a pair of movable devices remote from each other, means for interconnecting said devices whereby either device will move in synchronism with the other when movement is imparted to the latter, a temperature compensating device associated with said interconnecting means, and means for automatically rendering said compensating device inoperative while manual operation of the apparatus is occurring.

11. A movement transmitting apparatus comprising, in combination, a pair of movable devices remote from each other, means for interconnecting said devices whereby the remote device will move in synchronism with the near device when movement is imparted to the latter, a temperature compensating device to insure proper functioning of the apparatus when changes of temperature occur, and means for automatically rendering said compensating device inoperative while manual operation of the apparatus is occurring.

12. A movement transmitting apparatus comprising, in combination, a pair of movable devices remote from each other, means for interconnecting said devices whereby the remote device will move in synchronism with the near device when movement is imparted to the latter, a temperature compensating device to insure proper functioning of the apparatus when changes of temperature occur, means for automatically rendering said compensating device inoperative while manual operation of the apparatus is occurring, and means for automatically rendering said compensating device operative when manual operation of the device ceases.

13. A movement transmitting apparatus comprising, in combination, a pair of movable devices remote from each other, hydraulic pipe lines interconnecting said devices whereby the remote device will move in synchronism with the near device when movement is imparted to the latter, an hydraulic temperature compensating device, valves connecting said compensating device to said pipe lines, means for automatically rendering said compensating device inoperative when operation of the apparatus is taking place, and means for automatically rendering the device operative when operation of the apparatus ceases.

14. A movement transmitting apparatus comprising, in combination, a pair of movable devices remote from each other, means for interconnecting said devices whereby the remote device will move in synchronism with the near device when movement is imparted to the latter, a temperature compensating device to insure proper functioning of the apparatus when changes of temperature occur, a latch for preventing inadvertent actuation of the apparatus, means for releasing said latch for permitting actuation of the apparatus, and means effective when said latch is released for rendering said temperature compensating device operative, said means being effective for rendering the compensating device operative when said latch is restored to latching position.

15. A movement transmitting apparatus comprising, in combination, a pair of movable devices remote from each other, hydraulic pipe lines interconnecting said devices whereby the remote device will move in synchronism with the near device when movement is imparted to the latter, an hydraulic temperature compensating device, valves connecting said compensating device to said pipe lines, a lever for actuating the apparatus, a latch normally holding said lever in fixed position, means for releasing said latch to permit movement of said lever, and connections between said latch and said valves whereby said valves are closed when said latch is released.

16. The invention set forth in claim 15 in which said connections include a lever adapted to actuate each valve, and a sylphon enclosing each valve and its actuating lever, substantially as described.

17. A movement transmitting apparatus comprising, in combination, a pair of movable devices remote from each other, hydraulic pipe lines interconnecting said devices whereby the remote device will move in synchronism with the near device when movement is imparted to the latter, said movable devices and pipe lines being filled with liquid, means for submerging the near device in liquid, means for normally connecting the interior of the near device in free communication with the external liquid, means for actuating said near device, and means for causing the initial movement of said actuating means to close said connecting means.

18. The invention set forth in claim 17 in which said actuating means includes a pointer which indicates the extent of its movement on a chart.

19. The invention set forth in claim 17 in which said near and remote movable devices are provided with charts and pointers which indicate on either chart the position of the pointer on the other chart.

20. The invention set forth in claim 17 in which said near and remote movable devices are provided with charts and pointers which indicate on either chart the position of the pointer on the other chart, said remote pointer being provided with balanced springs tending to return both pointers to zero.

21. A movement transmitting apparatus comprising, in combination, a pair of movable devices remote from each other, hydraulic means for interconnecting said devices whereby either device will move in synchronism with the other of said devices when movement is imparted to the latter, and means effective at a predetermined position of said apparatus for automatically opening said hydraulic means to a source of liquid supply, for the purpose set forth.

22. The invention set forth in claim 21 in which said opening means comprises a valve operable by one of said movable devices.

23. The invention set forth in claim 21 in which said opening means comprises valves operable by one of said movable devices and each valve being connected to a different part of said hydraulic means.

24. A movement transmitting apparatus comprising, in combination, a pair of movable devices remote from each other, hydraulic means for interconnecting said devices whereby either device will move in synchronism with the other of said devices when movement is imparted to the latter, means effective at a predetermined position of said apparatus for automatically opening said hydraulic means to a source of liquid supply, and means for automatically closing said opening means when the apparatus is moved from said predetermined position.

In testimony whereof I hereto affix my signature.

CLARENCE A. DE GIERS.